US011748761B2

(12) United States Patent
Manmohan et al.

(10) Patent No.: US 11,748,761 B2
(45) Date of Patent: Sep. 5, 2023

(54) SYSTEMS AND METHODS FOR PROCESSING THIRD-PARTY RETURNS

(71) Applicant: Walmart Apollo, LLC, Bentonville, AR (US)

(72) Inventors: Maheer Manmohan, Newark, CA (US); Douglas E. Humphrys, Bentonville, AR (US); Sid Shake, Rogers, AR (US); Charles Harry Lobo, Cave Springs, AR (US); Tripuresh Pandey, Bengaluru (IN); Zhijian Huang, San Diego, CA (US); Nivea Mandavia, Sterling, VA (US); Casey S. Hulliberger, Rogers, AR (US); Darren W. Stanley, Falls Church, VA (US)

(73) Assignee: Walmart Apollo, LLC, Bentonville, AR (US)

( * ) Notice: Subject to any disclaimer, the term of this patent is extended or adjusted under 35 U.S.C. 154(b) by 211 days.

(21) Appl. No.: 17/235,669

(22) Filed: Apr. 20, 2021

(65) Prior Publication Data
US 2021/0326878 A1 Oct. 21, 2021

Related U.S. Application Data

(60) Provisional application No. 63/036,069, filed on Jun. 8, 2020.

(30) Foreign Application Priority Data

Apr. 20, 2020 (IN) .............................. 202041016928

(51) Int. Cl.
G06Q 20/40 (2012.01)
G06Q 10/0837 (2023.01)
G06Q 30/0601 (2023.01)

(52) U.S. Cl.
CPC ....... *G06Q 20/407* (2013.01); *G06Q 10/0837* (2013.01); *G06Q 30/0639* (2013.01)

(58) Field of Classification Search
None
See application file for complete search history.

(56) References Cited

U.S. PATENT DOCUMENTS 6,536,659 B1   3/2003   Hauser
7,124,095 B2   10/2006  Dutta
(Continued)

FOREIGN PATENT DOCUMENTS

JP   2013186601 A  *  9/2013  ......... G06F 16/2358

OTHER PUBLICATIONS

Aldrich, Gillian; "How to Return Things at Walmart"; <https://bestgifts.com/by-store/how-to-return-at-walmart/>; Jan. 8, 2019; pp. 1-6.
(Continued)

*Primary Examiner* — Paul S Schwarzenberg
(74) *Attorney, Agent, or Firm* — Fitch, Even, Tabin & Flannery, LLP

(57) ABSTRACT

In some embodiments, apparatuses and methods are provided herein useful to processing product returns. In some embodiments, a system for processing returns comprises a POS terminal located in a retail facility and configured to receive an order identifier associated with an online order that includes a product purchased from a third-party seller via the retailer's website, wherein the retail facility is a brick-and-mortar facility associated with the retailer, and wherein the third-party seller is not the retailer, and transmit, to a control circuit, the order identifier, a database configured to store order information, and the control circuit configured to receive the order identifier, determine the product, determine a refund amount for the product, determine a location (Continued)

to which the product should be returned, generate a return label, create a return transaction for the product, and transmit the return label, wherein the POS terminal is configured to print the return label.

18 Claims, 8 Drawing Sheets

(56) References Cited

U.S. PATENT DOCUMENTS

| | | | |
|---|---|---|---|
| 7,376,572 B2 | 5/2008 | Siegel | |
| 8,533,126 B1 | 9/2013 | Antony | |
| 10,002,341 B2 | 6/2018 | Schenken | |
| 2002/0019785 A1* | 2/2002 | Whitman | G06Q 30/06 705/28 |
| 2006/0149577 A1 | 7/2006 | Stashluk | |
| 2013/0275247 A1* | 10/2013 | Ramaratnam | G06Q 20/20 705/16 |
| 2014/0279668 A1* | 9/2014 | Lievens | G06Q 10/0837 705/340 |
| 2016/0148210 A1* | 5/2016 | Iso | G06K 7/1413 705/26.81 |
| 2019/0147444 A1* | 5/2019 | Nelms | G06Q 20/047 705/44 |
| 2020/0065791 A1* | 2/2020 | Patil | G07G 1/0063 |

OTHER PUBLICATIONS

Hilton, Scott; "Just in Time for the Holidays, Walmart Announces Major Improvements to its Marketplace—Will Offer Free Two-Day Shipping on Millions of New Items, In-Store Marketplace Returns; Changes to Roll Out this November"; <https://corporate.walmart.com/newsroom/2018/10/23/just-in-time-for-the-holidays-walmart-announces-major-improvements-to-its-marketplace-will-offer-free-two-day-shipping-on-millions-of-new-items-in-store-marketplace-returns-changes-to-roll-out-this-november>; Oct. 23, 2018; pp. 1-6.

Kohl's; "Returns at Kohl's"; <https://www.kohls.com/feature/amazon.jsp?clickId=w7pzvXyUGxyJUIswUxOMo3Q2Ukl1q1VYrXSjUs0&irgwc=1&utm_campaign=362118&utm_source%E2%80%A6>; available at least as early as May 9, 2019; pp. 1-3.

Keyes, Daniel; "Walmart is revamping returns for third-party orders"; <https://www.businessinsider.com/walmart-new-returns-process-2018-8>; Aug. 10, 2018; pp. 1-12.

Meldner, Richard; "Walmart Lands Bombshell on Marketplace Sellers—In-Store Returns!"; <https://www.eseller365.com/walmart-lands-bombshell-marketplace-sellers-in-store-returns/>; Aug. 9, 2018; pp. 1-10.

Progressive Grocer; "Walmart Eases Shopping, Returns through 3rd-Party Online Vendors"; <https://progressivegrocer.com/walmart-eases-shopping-returns-through-3rd-party-online-vendors>; Oct. 23, 2018; pp. 1-4.

Re-Turns; "Walmart Marketplace Returns"; <https://re-turns.com/walmart-marketplace-returns/>; Jan. 12, 2020; pp. 1-6.

Perez, Sarah; "Walmart's marketplace items get free 2-day shipping, in-store returns"; <https://techcrunch.com/2018/10/22/walmarts-marketplace-items-get-free-2-day-shipping-in-store-returns/>; Oct. 22, 2018; pp. 1-9.

Thomas, Lauren; "In its battle with Amazon, Walmart tries to make it easier for online shoppers to return their unwanted purchases without upsetting sellers"; <https://www.cnbc.com/2018/08/09/walmart-vs-amazon-walmartcom-makes-it-easier-to-return-purchases.html>; Aug. 9, 2018; pp. 1-11.

\* cited by examiner

| ORDER NUMBER 702 | DATE 704 | PRODUCT NUMBER(S) 706 | PRICE 708 | FEES 710 | REFUND AMOUNT 712 | CUSTODY FLAG 714 |
|---|---|---|---|---|---|---|
| 74-1205 | 03/06/2019 | 74214 | 7.53 | 0 | 7.53 | Y |
|  |  | 52749 | 18.99 |  | 18.99 |  |
| 19-4828 | 05/25/2019 | 98472 | 29.42 | 0 | 29.42 | Y |
| 01-4682 | 05/08/2019 | 57295 | 105.82 | 5.99 | 99.83 | N |
| 38-1749 | 02/22/2019 | 29575 | 1.97 | 0 | 1.97 | N |
| ooo | ooo | ooo | ooo | ooo | ooo | ooo |
| 55-1947 | 04/30/2019 | 07849 | 53.46 | 2.50 | 50.96 | Y |

INITIATE RETURN

RETURN PLATFORM

SEARCH

SCAN RECEIPT OR ENTER ORDER NUMBER: 82-6843

| ORDER NUMBER 82-6843 | | | |
|---|---|---|---|
| RETURN? | PRODUCT NO. | DESCRIPTION | PRICE |
| ☐ | 73057 | COMPUTER | 1,299.00 |
| ☒ | 13274 | KEYBOARD | 129.00 |
| ☐ | 84724 | WIRELESS MOUSE | 99.00 |

CUSTODY?

FIG. 8

SYSTEMS AND METHODS FOR PROCESSING THIRD-PARTY RETURNS

CROSS-REFERENCE TO RELATED APPLICATIONS

This application claims the benefit of Indian Provisional Application No. 202041016928, filed Apr. 20, 2020, and U.S. Provisional Application No. 63/036,069, filed Jun. 8, 2020, which are incorporated by reference in their entirety herein.

TECHNICAL FIELD

This invention relates generally to processing returns and, more particularly, to processing returns for products purchased from third-party sellers.

BACKGROUND

Many retailers now sell products and/or services online via websites in addition to, or in lieu of, retail facilities. Additionally, retailers may sell products in store (i.e., in retail facilities), as well as online, that are offered by third-party sellers. When a retailer provides products online that are sold by third-parties, it can cause confusion and frustration for customers. Specifically, when a customer purchases a product from a retailer's website, if the product was sold by a third-party seller, the customer is not able to return the product at the retailer's brick-and-mortar retail facility. If the customer was unaware that the product was sold by a third-party, this may cause confusion and dissatisfaction. Even if the customer was aware that he or she purchased the product from a third-party seller, he or she may be frustrated when he or she cannot return the product at the retailer's retail facility. Consequently, a need exists for better systems and methods for processing returns for products that are purchased from third-party sellers.

BRIEF DESCRIPTION OF THE DRAWINGS

Disclosed herein are embodiments of systems, apparatuses and methods pertaining to processing returns. This description includes drawings, wherein:

FIG. 7 is a diagram of a table 700 including order information, according to some embodiments; and FIG. 8 is a diagram of an example user interface 800 for processing returns, according to some embodiments.

Figure 1:
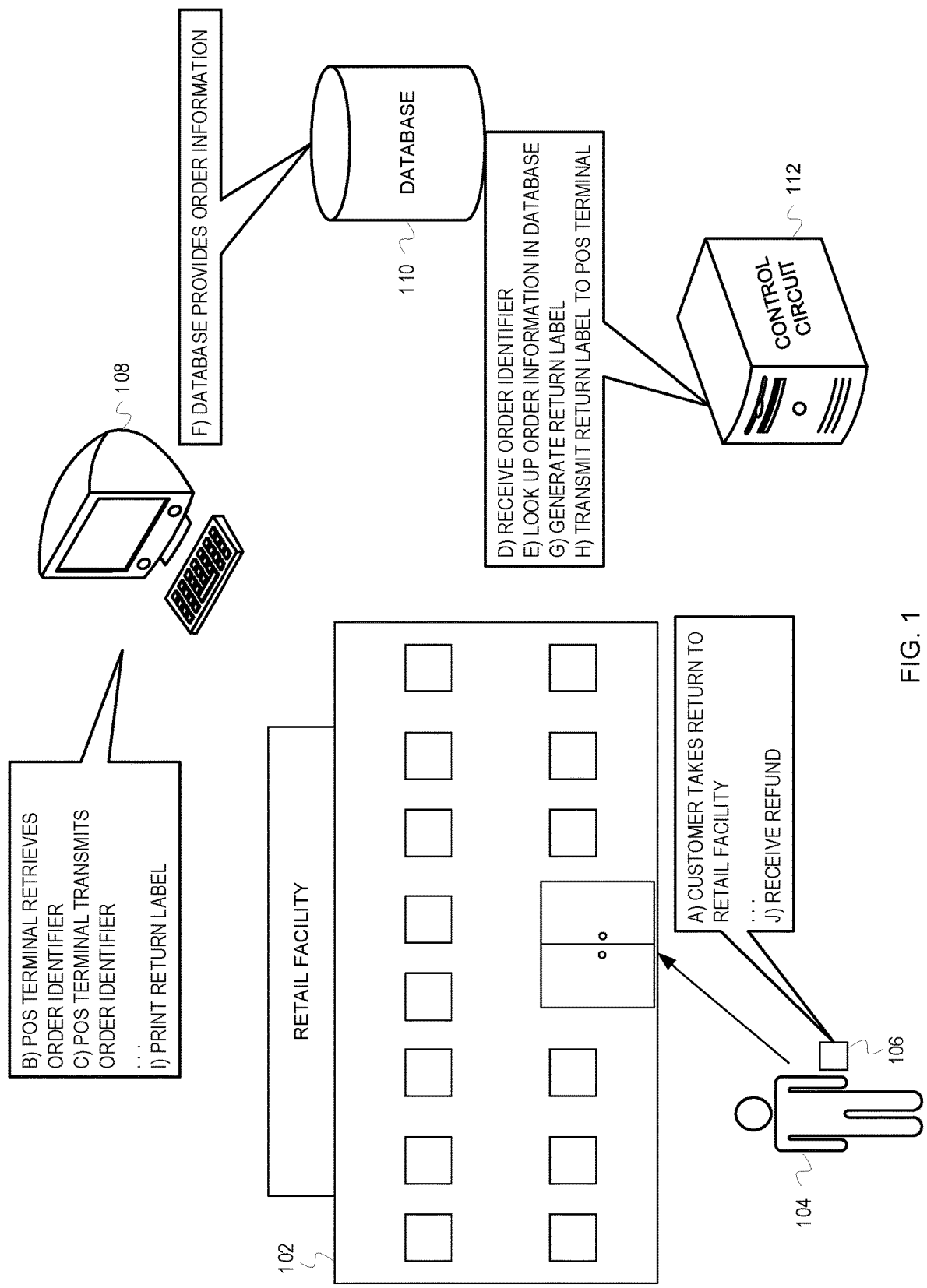
FIG. 1 is a diagram depicting a customer 104 returning a product 106 purchased from a third-party seller at a retail facility 102, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to processing returns. In some embodiments, a system for processing returns comprises a point-of-sale (POS) terminal, wherein the POS terminal is located in a retail facility, and wherein the POS terminal is configured to receive an order identifier, wherein the order identifier is associated with an online order that includes a product, wherein the product was purchased from a third-party seller via the retailer's website, wherein the retail facility is a brick-and-mortar facility associated with the retailer, and wherein the third-party seller is not the retailer, present, via a display device of the POS terminal, a custody prompt, receive, via a user input device of the POS terminal, selection of the custody prompt, and transmit, to a control circuit, the order identifier, a database, wherein the database is configured to store order information, and the control circuit, wherein the control circuit is communicatively coupled to the POS terminal, the control circuit configured to receive, from the POS terminal, the order identifier and an indication of the selection of the custody prompt, determine, based on accessing the database, the product, determine, based on accessing the database, that the product is eligible to be returned, determine, based on accessing the database a refund amount for the product, determine, based on accessing the database, a location to which the product should be returned, generate, based on the location to which the product should be returned, a return label, create, with the third-party seller, a return transaction for the product, transmit, to the POS terminal, the return label, update, in the database in response to receipt of the indication of the selection of the custody prompt, a custody flag, wherein the custody flag is associated with the product, and wherein the custody flag indicates possession of the product by the retailer, wherein the POS terminal is further configured to print the return label.

As previously discussed, many retailers offer products for sale that are sold by third-parties. For example, a retailer may operate a website (i.e., the "retailer's website") from which customers can purchase products sold by the retailer as well as products sold by parties other than the retailer (i.e., "third-parties" or "third-party sellers"). Though the retailer processes the payment for the product purchased from the third-party, the retailer may not process and/or fulfill the order. Rather, the third-party, and not the retailer, may process and/or fulfill the order. While this can provide increased buying opportunities and greater product selection for customers, it can cause confusion and/or dissatisfaction as many customers assume that a product purchased from a retailer's website was in fact sold by the retailer. Additionally, some customers may choose to forego a purchase if products they want are sold by third-parties, due to previous experience and/or concerns about difficulties arising from the transaction. When customers forego purchases, it can result in lost sales for the retailer.

One common cause of customer dissatisfaction is the inability to return a product he or she purchased online at a retail facility (i.e., a brick-and-mortar facility associated with the retailer). In this scenario, a customer has purchased a product from the retailer's website. However, the product was not sold by the retailer, but rather by a third-party seller. When the customer attempts to return the product at the retail facility, he or she is turned away. Instead, the customer must contact the third-party seller to return the product. If the customer was unaware that he or she purchased the product from a third-party seller, he or she may be confused and/or frustrated that he or she cannot return the product at the retail facility. If the customer was aware that he or she purchased the product from a third-party seller, he or she may still be frustrated when he or she cannot return the product at the retail facility.

Described herein are systems, methods, and apparatuses that seek to minimize, if not eliminate, this point of customer dissatisfaction. In some embodiments, a system is described that processes returns for products purchased from a retailer's website that were sold by third-parties. The system integrates with a third-party's system to determine return eligibility, determine a refund amount, and generate a return label for the product. To the customer, it appears as if he or she is simply returning a product at the retail facility. The discussion of FIG. 1 provides an overview of such a system.

FIG. 1 is a diagram depicting a customer 104 returning a product 106 purchased from a third-party seller at a retail facility 102, according to some embodiments. The diagram depicted in FIG. 1 includes a retail facility 102, a POS terminal 108, a database 110, and a control circuit 112. The example operations depicted in FIG. 1 include operations amongst the components of FIG. 1. FIG. 1 depicts operations at stages A-J. The stages are examples and are not necessarily discrete occurrences over time (e.g., the operations of different stages may overlap). Additionally, FIG. 1 is an overview of example operations.

At stage A, the customer 104 takes the product 106 to the retail facility 102 to return the product. That is, the customer 104 takes the return (i.e., the product 106 that he or she wishes to return) to the retail facility 102. In some embodiments, the customer 104 takes the product 106 to the same location in the retail facility 102 (e.g., a return desk, customer service location, etc.) that he or she would if he or she were returning a product that was sold by the retailer. The retail facility 102 is a brick-and-mortar facility. The customer 104 purchased the product via a retailer's website. The retail facility 102 is associated with the retailer. That is, the retailer operates, or is otherwise associated with, both the website and the retail facility 102. Although the customer 104 purchased the product 106 via the retailer's website, the product 106 was sold by a third-party seller. That is, the product was sold by an entity that is not the retailer. In some embodiments, the customer 104 brings the product 106 to the retail facility 102 packaged and ready for shipping. In other embodiments, the customer 104 simply brings the product 106 to the retail facility 102, and an associate of the retail facility 102 prepares the product 106 for shipping or the customer 104 prepares the product 106 for shipping once he or she has arrived at the retail facility 102.

At stage B, the POS terminal 108 retrieves an order identifier. The order identifier is associated with an online order. The online order includes the product 106. The POS terminal 108 is located in the retail facility 102. The customer 104, or the associate of the retail facility 102, provides the POS terminal 108 with information necessary to retrieve the order identifier. For example, the customer 104 can provide the POS terminal 108, or the associate, with an order number, a membership or account number (e.g., associated with the customer's 104 online account), a receipt, an invoice, email address, phone number, etc.

At stage C, the POS terminal 108 transmits the order identifier. The POS terminal 108 transmits the order identifier to the control circuit 112. The order identifier indicates the order with which the purchase of the product 106 is associated.

At stage D, the control circuit 112 receives the order identifier. The control circuit 112 receives the order identifier from the POS terminal 108.

At stage E, the control circuit 112 looks up the order in the database 110 based on the order identifier. The database 110 stores order information. The order information can comprise receipts, invoices, etc. The order information can include products purchased in an order, products returned from an order, product return eligibility, return shipping fees, restocking fees, etc.

At stage F, the database 110 provides the order information. The control circuit 112 retrieves the order information from the database 110 and the database 110 provides the order information to the control circuit 112.

At stage G, the control circuit 112 generates a return label. The return label includes shipping information for returning the product 106. Additionally, in some embodiments, the control circuit 112 creates a return transaction with the third-party seller. The return transaction notifies the third-party seller that the product 106 is being returned.

At stage H, the control circuit 112 transmits the return label to the POS terminal 108. The control circuit 112 does not transmit the physical return label. Rather, the control circuit 112 transmits an electronic return label (e.g., a file including the return label in a printer control language file, a PDF file, etc.).

At stage I, the POS terminal 108 receives the return label and prints the return label. The POS terminal 108 prints the return label so that the associate, or the customer 104, can affix the return label to the product 106 (or a package containing the product 106) for shipping.

At stage H, the customer 104 receives a refund. The refund can be provided in any suitable manner. For example, the refund can be provided in the same manner in which the customer 104 purchased the product 106, as a store credit for the retailer and/or the third-party seller, etc. The refund is the purchase price of the product less any costs associated with the return, dependent upon the terms of the sale. For example, the customer 104 may be charged restocking and/or return shipping fees. These fees can be subtracted from the refund. Similarly, the refund can include amounts above the price paid for the product 106, such as any taxes paid by the customer 104.

Figure 2:
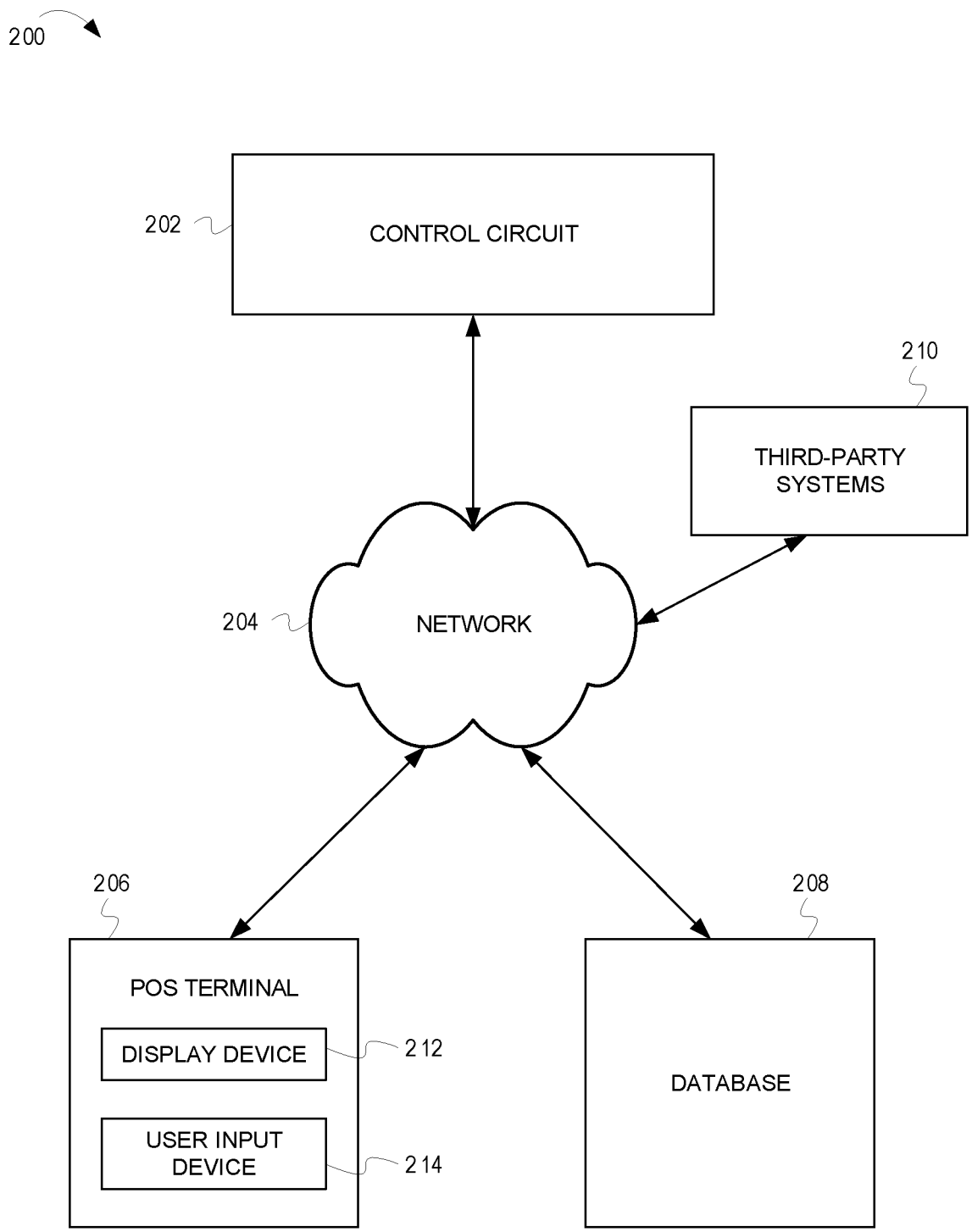
FIG. 2 is a block diagram of a system 200 for processing returns, according to some embodiments.

While the discussion of FIG. 1 provides an overview of a system for processing returns, the discussion of FIG. 2 provides additional detail regarding such a system.

FIG. 2 is a block diagram of a system 200 for processing returns, according to some embodiments. The system 200 includes a control circuit 202, a POS terminal 206, a database 208, and third-party systems 210. One or more of the control circuit 202, the POS terminal 206, the database 208, and the third-party systems 210 can be communicatively coupled via a network 204. Accordingly, the network 204 can be of any suitable type. For example, the network 204 can include a local area network (LAN) and/or wide area network (WAN), such as the Internet, and can include wired and/or warless links.

The database 208 is configured to store order information. The order information can include order histories, invoices, receipts, customer identifiers, payment methods, etc. The order information is used to retrieve orders for customers to process returns. In some embodiments, the database 208 also includes return eligibility rules. The return eligibility rules dictate when and if a return is allowable and any costs associated with the return. The return eligibility rules can include rules for any desired category, such as return windows (e.g., a period of time after purchase in which a product is eligible to be returned), return shipping fees, restocking fees, product conditions (e.g., whether the product needs to be unused, in its original packaging, etc.), etc. The return eligibility rules can be included in third-party seller information stored in the database 208. In addition to the return eligibility rules, the third-party seller information can include addresses, preferences, etc. of the third-party sellers. For example, the third-party seller information can include information regarding how returns should be processed, where returns should be sent, how refunds should be provided, etc. In some embodiments, the retailer may dictate at least a portion of the third-party information. For example, the retailer may require certain eligibility rules (e.g., returns must be allowed for at least 30 days) and refund provision requirements (e.g., refunds must be provided in the same manner as payment was received). The third-party seller information can be provided by the third-party sellers and/or the retailer. For example, the third-party seller information can be received by the database 208 from the third-party systems 210.

Further, in some embodiments, the order information can include custody information for products. For example, the database 208, described in additional detail with respect to FIG. 7, can include a custody flag field. In a simple example, the custody flag field is a binary field that indicates whether the retailer is in possession of a product that has been returned. In this example, when the employee scans the product and the customer relinquishes custody of the product to the employee or return system, the custody flag can be updated to indicate that the retailer is now in possession of the product.

The POS terminal 206 is located in a retail facility. In some embodiments, the POS terminal 206 is a traditional terminal an associate can use to complete purchases for customers, return products, etc. In other embodiments, the POS terminal 206 can be part of a self-service kiosk for use by customers to purchase and/or return products. Further, in some embodiments, the POS terminal may be a device used exclusively to make returns. For example, the POS terminal can be a device accessible by an employee and/or customer to initiate returns and/or complete the return process. Accordingly, the POS terminal can include a number of hardware and software components, such as a display device 212, a user input device 214, a hard drive, and POS software. The display device 212 presents information to the employee and/or customer and can be of any suitable type (e.g., a liquid crystal display (LCD), a light emitting diode display (LED), a cathode ray tube (CRT) display, etc.). For example, the display device 212 can present order information, product information, instructions, etc. Additionally, in some embodiments, the display device 212 can present prompts (e.g., to scan or enter an order number, set a custody flag, enter return reason codes, etc.). The user input device 214 allows the employee and/or customer to provide information to the system via the POS terminal 206. For example, the employee and/or customer can provide order numbers, return reason codes, select prompts, etc. via the user input device 214. Accordingly, the user input device 214 can be of any suitable type (e.g., a mouse, a keyboard, a joystick, a scanner (e.g., an optical reader or RFID reader), etc.) and can include multiple hardware components (e.g., a keyboard and a mouse). Further, in some embodiments, the display device 212 and the user input device 214 can be incorporated into a single device, such as a touchscreen. The associate, or the customer, can utilize the user input device to enter order numbers, scan products and/or invoices, etc. Though the control circuit 202 and the POS terminal 206 are depicted as two distinct components in FIG. 2, embodiments are not so limited. For example, in some embodiments, the control circuit 202 can be resident on the POS terminal 206.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

Generally, the control circuit 202 works with the POS terminal 206 and the database 208 to process returns. In some embodiments, the control circuit 202 works with the third-party systems 210 to process returns. When a customer brings a product that he or she wishes to return to the retail facility, an associate, or the customer, initiates the return via the POS terminal 206. For example, the associate, or the customer, can initiate the return by scanning an identifier associated with the product (e.g., a barcode) and/or an invoice. The POS terminal 206 receives the order identifier and transmits it to the control circuit 202.

The control circuit 202 receives the order identifier and interacts with the database 208 and, in some embodiments, the third-party systems 210, to process the return. Using the order identifier, the control circuit 202 accesses the database 208 to determine (e.g., identify) the product that is being returned. The determination of the product can be conducted based on an order history (e.g., an invoice) stored in the database 208 and/or a scan of the product at the POS terminal 206. After determining the product, the control circuit 202 determines whether the product is eligible to be returned. Return eligibility can be based on the date of purchase, the date the return was initiated, conditions of purchase, condition of the product when sold, condition of the product at return, etc. For example, if the product or third-party seller has a return window of 14 days and the customer brought the product to the retail facility 25 days after purchase, the product may not be eligible for return. However, if the return window is 14 days and the customer brought the product to the retail facility 12 days after purchase, the product may be eligible for return.

If the product is eligible to be returned, the control circuit 202 determines a refund amount for the product. The refund amount is based on the purchase price of the product and the return eligibility rules. If the third-party seller, or the retailer, have restocking fees or return shipping fees, those fees are deducted from the purchase price. Additionally, if the product has been used, is incomplete (e.g., missing parts), is damaged, etc. the refund amount may be adjusted. Additionally, in some embodiments, based on the return eligibility rules, the customer may be offered to keep the product and receive a refund. For example, if the cost of processing the return (e.g. return shipping costs and associate costs associated with restocking) exceed the value of the product, the customer may be permitted to keep the product and receive a refund (e.g., of the entire purchase price or a portion of the purchase price). Such options in providing refunds for products is discussed, for example, in U.S. Provisional Application No. 62/847,039 filed May 13, 2019, which is incorporated by reference herein in its entirety.

The control circuit 202 also determines a location to which the product should be returned. The control circuit 202 determines the location to which the product should be returned based on the third-party seller information. For example, the third-party seller may request that products be returned to a distribution center, the third-party, another entity, etc. The control circuit 202 then creates a return transaction for the product with the third-party seller. The return transaction can notify the third-party seller that the product has been returned and that a refund will be, or should be, issued. The control circuit 202 can interact with the third-party systems 210 to create the return transaction.

The control circuit 202 creates a return label for the product and transmits the return label to the POS terminal 206. The return label includes a shipping label that can be affixed to the product. The POS terminal 206 prints the return label so that the associate or customer can affix the return label to the product (or a package including the product).

In some embodiments, the control circuit 202 issues a refund for the customer based on the refund amount. In such embodiments, the control circuit 202 can, via the POS terminal 206, provide the refund amount to the customer. The refund can be provided in any suitable manner (e.g., as a store credit, cash, in the method of payment, etc.). The refund can also be provided at any desired time. For example, the control circuit 202 can issue the refund immediately, after the product has been picked up (e.g., by a parcel service), after the product is received by the third-party seller (e.g., after confirmation is received that the third-party seller received the product), after a threshold period of time has lapsed, etc. Additionally, in some embodiments, the system 200 can include failsafe mechanisms to ensure that the customer receives the refund. That is, because the product was purchased from the third-party, the third-party may be responsible for providing the refund. In such embodiments, the control circuit 202 can issue a refund if the third-party seller fails to do so. For example, if the customer has not received a refund within a threshold period of time (e.g., one week, one month, etc.), the control circuit 202 can issue a refund to the customer for the refund amount. When this happens, the control circuit 202 can debit the amount of the refund from the third-party systems 210 and/or generate a request for the refund amount from the third-party systems 210.

Figure 3:
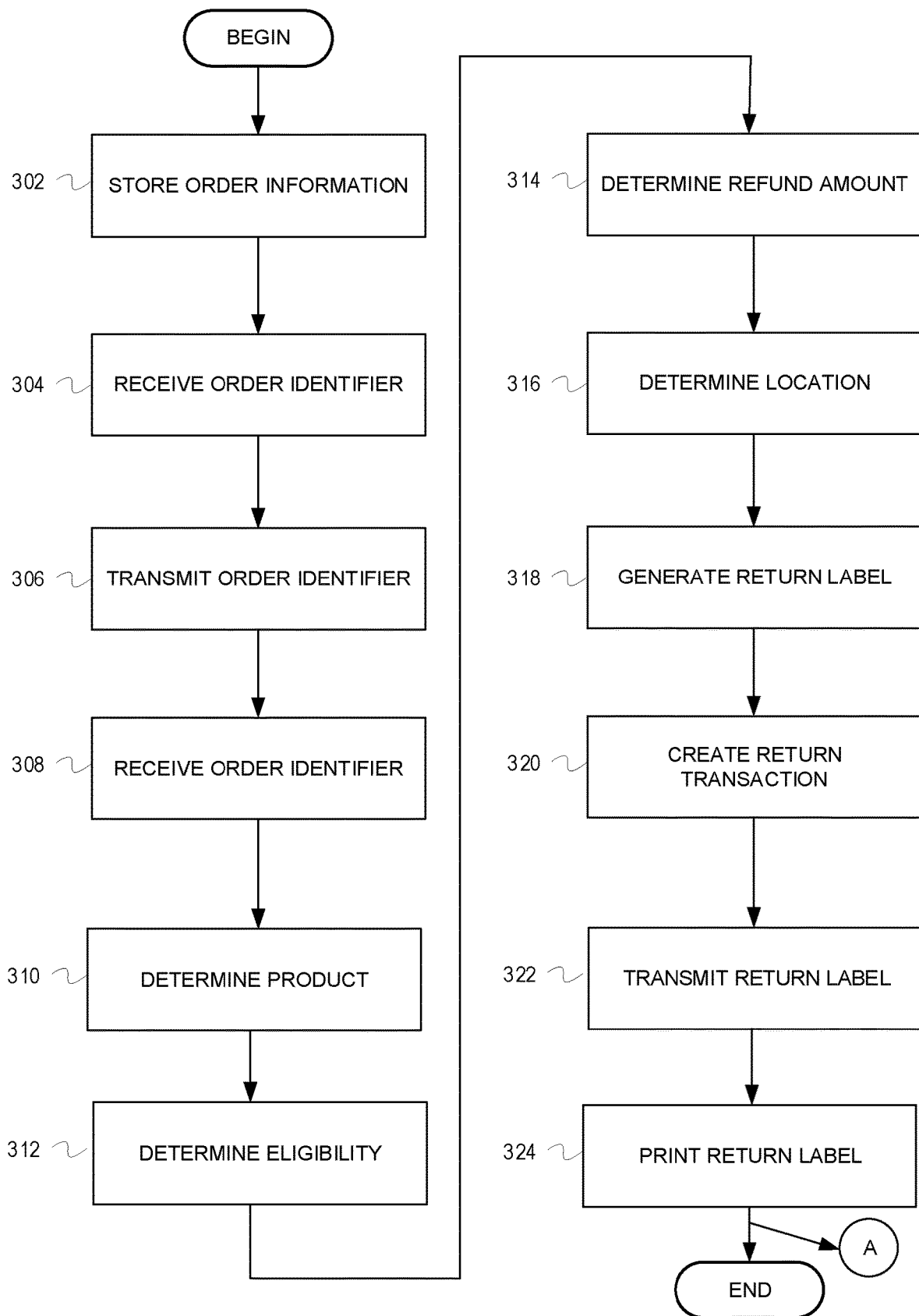
FIG. 3 is a flow chart depicting example operations for processing returns, according to some embodiments.

While the discussion of FIG. 2 provides additional detail regarding a system for processing returns, the discussion of FIG. 3 describes example operations for processing returns.

FIG. 3 is a flow chart depicting example operations for processing returns, according to some embodiments. The flow begins at block 302.

At block 302, order information is stored. For example, order information can be stored in a database. The order information includes previous orders placed by customers (e.g., invoices receipts, etc.). The order information can also include customer information and payment information. In some embodiments, the database also stores third-party seller information. The third-party seller information can include names, address, locations, etc. of third-party sellers as well as refund eligibility rules. The flow continues at block 304.

At block 304, an order identifier is received. For example, a POS terminal can receive the order identifier. The order identifier is used to look up the order and can be one or more of an order number, a phone number, and account number, and an email address. The POS terminal can receive the order identifier from the customer or an associate. For example, the customer or associate can scan an invoice or manually enter the order identifier at the POS terminal. The flow continues at block 306.

At block 306, the order identifier is transmitted. For example, the POS terminal can transmit the order identifier to a control circuit. The flow continues at block 308.

At block 308, the order identifier is received. For example, the control circuit can receive the order identifier from the POS terminal. The flow continues at block 310.

At block 310, a product is determined. For example, the control circuit can determine the product based on the order identifier. The control circuit can receive information regarding the product from the POS terminal and/or look up an order associated with the order identifier by accessing the database. The flow continues at block 312.

At block 312, return eligibility is determined. For example, the control circuit can determine the return eligibility. The control circuit can determine the return eligibility based on accessing the database. If the database includes the return eligibility rules, the control circuit references the return eligibility rules to determine whether the product is eligible for return. The flow continues at block 314.

At block 314, a refund amount is determined. For example, the control circuit can determine the refund amount. The refund amount is based on the purchase price of the product and the return eligibility rules. For example, if the third-party seller (or retailer) has a restocking fee, the restocking fee can be deducted from the purchase price to determine the refund amount. The flow continues at block 316.

At block 316, a location is determined. For example, the control circuit can determine the location. The location is the location to which the product should be returned. The location to which the product should be returned can be based on the third-party seller information. For example, a third-party seller may request that returns be sent to a distribution center, directly to the third-party seller, etc. The flow continues at block 318.

At block 318, a return label is generated. For example, the control circuit can generate the return label. The return label includes a shipping label for returning the product. In some embodiments, the return label can also include a return invoice. The return invoice can be sent to the third-party seller and/or provided to the customer. The return invoice can be sent to the third-party seller and/or provided to the customer physically and/or electronically. The flow continues at block 320.

At block 320, a return transaction is created. For example, the control circuit can create the return transaction with the third-party seller. The return transaction informs the third-party seller of the return and can include instructions for the third-party seller. For example, the instructions can include the refund amount, the date of the return, the order identifier, conditions for the return, timing for refund issuance, etc. In some embodiments, the return transaction includes transmitting the return invoice to the third-party seller. The flow continues at block 322.

At block 322, the return label is transmitted. For example, the control circuit can transmit the return label. The return label is transmitted to the POS terminal. Transmission of the return label can include transmissions of an electronic version of the return label, such as a PDF file. The flow continues at block 324.

At block 324, the return label is printed. For example, the POS terminal can print the return label. The associate, or the customer, can affix the return label to the product, or a package containing the product. In some embodiments, custody flags can be used to indicate at least possession of the product by the retailer or any other desired entity. As indicated by circle A in FIG. 4, in such embodiments, the flow continues at block 402 of FIG. 4. Though these operations are depicted as occurring after the operations of block 324 in FIG. 3, embodiments are not so limited. For example, in some embodiments, one or more of the operations depicted in FIG. 4 can occur at different points in the process and need not occur together or in the order presented in FIG. 4.

Figure 4:
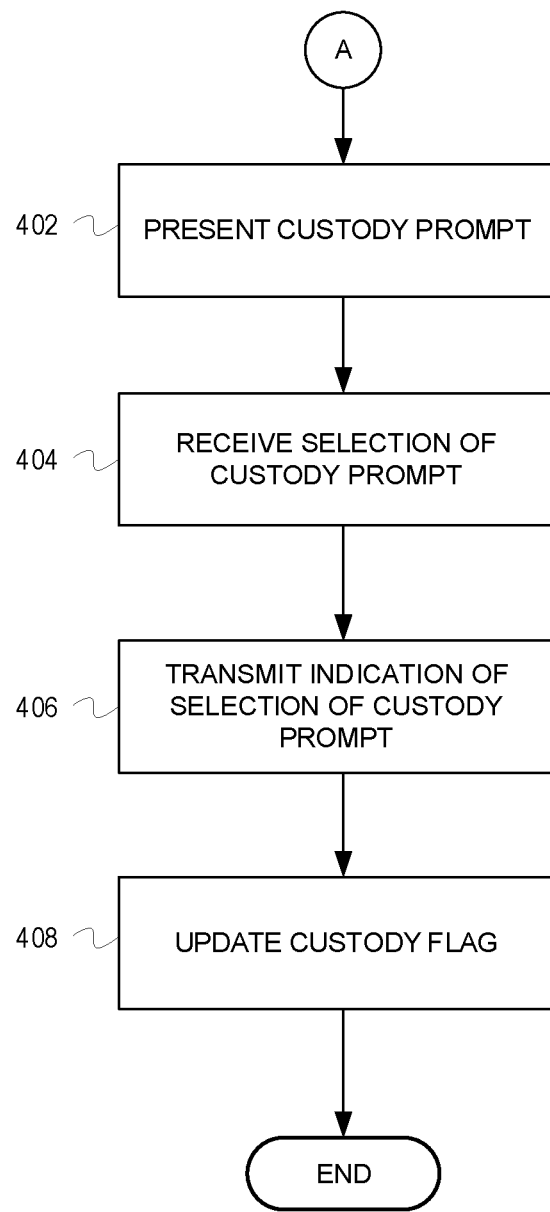
FIG. 4 is a flow diagram depicting example operations for updating a custody flag while processing returns, according to some embodiments.

While the discussion of FIG. 3 describes example operations for processing returns, the discussion of FIG. 4 provides additional detail regarding custody flags when processing returns.

FIG. 4 is a flow diagram depicting example operations for updating a custody flag while processing returns, according to some embodiments. As previously discussed, in some embodiments, the operations described with respect to FIG. 4 occur in connection with the operations described with respect to FIG. 3, as indicated by the continuation of the operations of FIG. 3 at circle A. The flow begins at block 402.

At block 402, a custody prompt is presented. For example, a custody prompt can be presented by a display device of the POS terminal. The custody prompt asks an employee, or the customer, to positively indicate at least that the product is being returned to the retailer. For example, the custody prompt can ask the employee to verify that the customer has physically returned the product and that the product is in the retailer's possession. Additionally, the custody prompt can ask the employee and/or customer to positively indicate that other tasks have been performed. For example, the custody prompt can ask the employee and/or customer to positively indicate that one or more or all of the following events have occurred: that the customer is in fact returning the product; that the employee has received the product from the customer (or that the customer has surrendered the product to the employee or return system); that the product is in returnable condition (e.g., not damaged, including all of its parts, in a ready-to-ship condition, etc.); that the return label has been printed and properly applied to the product; and that the product has been or will be placed in a specific location (e.g., a designated bin) for shipping), etc. The flow continues at block 404.

At block 404, a selection of the custody prompt is received. For example, the POS terminal can receive the selection of the custody prompt via a user input device of the POS terminal. The custody prompt can be selected by the employee and/or the customer, dependent upon the embodiment. For example, the employee can select the custody prompt when the customer has physically provided the product to the customer and thus the customer is no longer in possession of the product. In some embodiments, the selection of the custody prompt is a positive action that must be performed by the employee (or the customer). That is, instead of custody being assumed based, for example, by the initiation of the return or generation of the return transaction, in such embodiments the employee must explicitly indicate at least that he or she has received the product. Further, in some embodiments, the return label may be prevented from printing until the custody prompt has been selected. Likewise, in systems in which the customer selects the custody prompt, the customer explicitly indicates that he or she has provided the retailer with the product by, for example, handing the product to an employee of the store, leaving the product in a designated area (e.g., a bin, at a customer service counter, etc.). The flow continues at block 406.

At block 406, an indication of the selection of the custody prompt is transmitted. For example, the control circuit can transmit the indication of the selection of the custody prompt to the database. The flow continues at block 408.

At block 408, a custody flag is updated. For example, the control circuit can update the custody flag in the database. The custody flag is associated with the product. For example, the custody flag can be associated with the product in that the custody flag indicates at least that a product (e.g., the product) in an order has been returned and is in the possession of the retailer. In some embodiments, the custody flag is a binary value. That is, in some embodiments, the value of the custody flag indicates one of two states: (1) that the product is in the retailer's possession or (2) the product is not in the retailer's possession. And in some embodiments, the value of the custody flag indicates one of two states: (1) that one or more or all of the following events have occurred: that the customer is in fact returning the product; that the employee has received the product from the customer (or that the customer has surrendered the product to the employee or return system); that the product is in returnable condition; that the return label has been printed and properly applied to the product; and that the product has been or will be placed in a specific location for shipping; and (2) that the one or more of all of the above events have not occurred.

In some embodiments, updating the custody flag can trigger other actions and/or processes. For example, the update to the custody flag can initiate failsafe mechanisms that ensure that the customer is provided with whatever refund to which he or she may be entitled. In one embodiment, when the custody flag is updated to a value that indicates that the retailer is in possession of the product (e.g., a "yes" value), a timer can begin. The timer can be set to a predetermined length of time, such as 24 hours, 48 hours, one week, one month, etc. The timer is used to ensure that certain actions occur within the time period. For example, once the custody flag is set to "yes," a 48 hour timer can begin. If the product is not shipped (e.g., scanned by a delivery agent) within 48 hours, a refund can automatically be provided to the customer. Such embodiments may minimize the possibility that the returned product was misplaced between receipt by the retailer and shipment. If, however, the product has been shipped before the timer expires, it can be assumed that the product has not been misplaced and that the customer's refund will be provided appropriately. Further, in some embodiments, similar failsafe mechanisms can be employed after the product has left the retailer's possession. For example, as described previously, the retailer may provide an automatic refund to the customer if the third-party seller has not provided the refund within a specified time period. Continuing the example provided above, once the product has shipped, the 48 hour timer may end. However, a new timer can begin once the product has been delivered to the third-party seller (e.g., as indicated by tracking information associated with the return label). If a refund has not been provided, or initiated by the third-party seller, before this new timer expires, the retailer can provide a refund to the customer to ensure that that the customer is properly refunded.

It is noted that while circle A is shown after step 324 in FIG. 3, depending on what information or events are represented by the setting of the custody flag and/or what events are triggered by the setting of the custody flag, the process of FIG. 4 may occur at different points in the process of FIG. 3.

Figure 5:
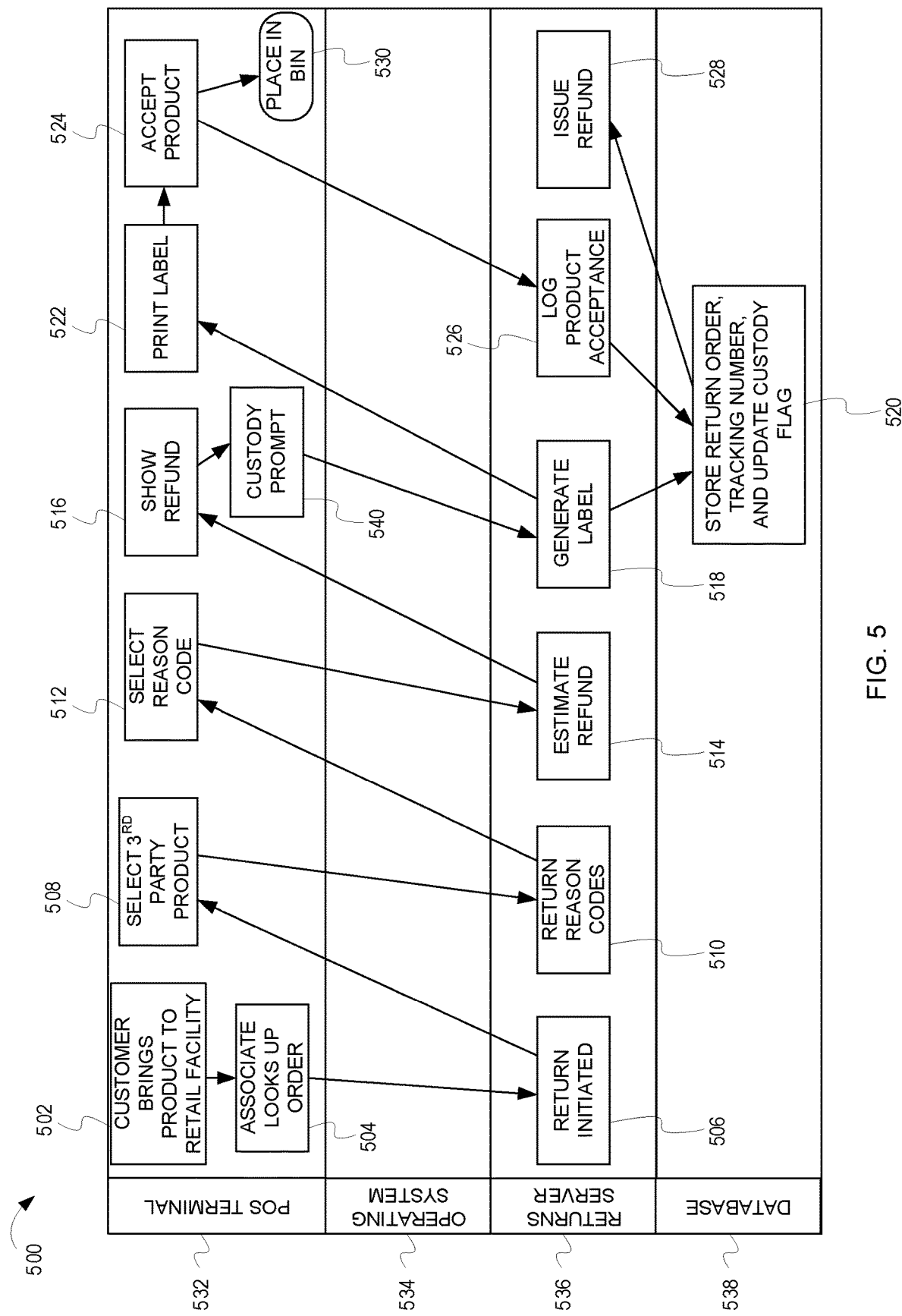
FIG. 5 is a diagram depicting a flow path 500 for processing returns, according to some embodiments.

While the discussion of FIGS. 3 and 4 describe example operations for processing returns, the discussion of FIG. 5 provides additional detail regarding a flow path for processing returns.

FIG. 5 is a diagram depicting a flow path 500 for processing returns, according to some embodiments. The flow path 500 depicts operations between a POS terminal 532, an operating system 534, a returns server 536, and a database 538. The process begins with the customer bringing the product to the retail facility at operation 502. In some embodiments, the customer brings the product to the retail facility packaged and ready to ship. Alternatively, in some embodiments, the customer may bring the product to the retail facility requiring packaging for shipping. When the customer brings the product to the retail facility, an associate looks up the order via the POS terminal 532 at operation 504. The associate looking the order up initiates a return for the product at the returns server 536 at operation 506. The associate can, for example, look up the order via an order identifier. When the associate looks up the order, information associated with the order is retrieved (e.g., products purchased and/or returned in a transaction associated with the order). In some embodiments, the information associated with the order is stored in the database 538.

At operation 508, the customer, or employee, via the POS terminal 532, selects a third-party product to return via the POS terminal 532. The customer, or employee, can select the product to return via selection of a list of products associated with the transaction and/or by scanning the product (e.g., a tag or other label affixed to or otherwise associated with the product). The product that the customer wishes to return is a third-party product (i.e., the product was sold by a third-party seller). For example, the customer may have purchased the product from the retailer's website, though the product was actually sold by a third-party seller via the retailer's website. When selecting the product to return, the customer, or employee, can optionally select a return reason code at operation 512. The return reason codes indicate why the customer would like to return the product. For example, the customer may no longer need the product, the product may not have arrived as expected or described, the product may be the wrong size/color/style/etc., the product may have arrived too late, the product may have arrived damaged, etc. The return reason code may impact the return amount for the product (discussed in more detail below). The return reason code is processed by the returns server 536 and is optionally stored in the database 538, at operation 510.

The returns server 536 estimates a refund for the product at operation 514. The refund (i.e., the amount to be refunded to the customer based on the return) is based on the purchase price of the product, and possibly fees to be incurred by, or credits provided to, the customer. For example, the customer may be charged return shipping fees, restocking fees, etc. As previously discussed, the reason for the return may impact the refund amount. For example, the customer may not be charged restocking fees and/or return shipping fees if an incorrect product was sent. The returns server 536 transmits the refund amount to the POS terminal 532 for presentation to the customer and/or employee at operation 516.

To continue the return, the returns server 536 generates a return label for the return at operation 518. The return label can be a shipping label and, in some embodiments, include return information for the product (e.g., a return invoice, a return receipt, etc.). The returns server 536 transmits the return label to the POS terminal 532. The POS terminal 532 prints the return label at operation 522. Additionally, at operations 540, the POS terminal 532 presents a custody prompt. The custody prompt is a selection that is made by the employee, or customer, to indicate at least that the retailer is in possession of the product. In addition to transmitting the return label to the POS terminal 532, the returns server 536 stores information relating to the return in the database 538 at operation 520 (e.g., tracking numbers, updating the custody flag based on selection of the custody prompt, etc.). The information relating to the return can include a return order, a tracking number, an indication of acceptance of the return, etc. In some embodiments, storage of all or some the information relating to the return occurs after the product is accepted at operation 524. That is, the indication of acceptance of the product may occur after the retailer has accepted the product as a return (e.g., the returns server 536 can log acceptance of the return in the database 538 at operation 526).

Once the retailer has accepted the product as a return, the customer, or employee, places the product in a bin (e.g., a return bin) at operation 530. After the return has been accepted, the returns server 536 issues a refund to the customer at operation 528. The issuance of the refund can occur at any suitable time and in response to any suitable condition. For example, in some embodiments, the refund can be issued to the customer immediately upon acceptance of the product. Alternatively, the refund may not be issued immediately. Rather, the refund may be issued after the third-party received the item, a predefined period of time has passed, etc.

Figure 6:
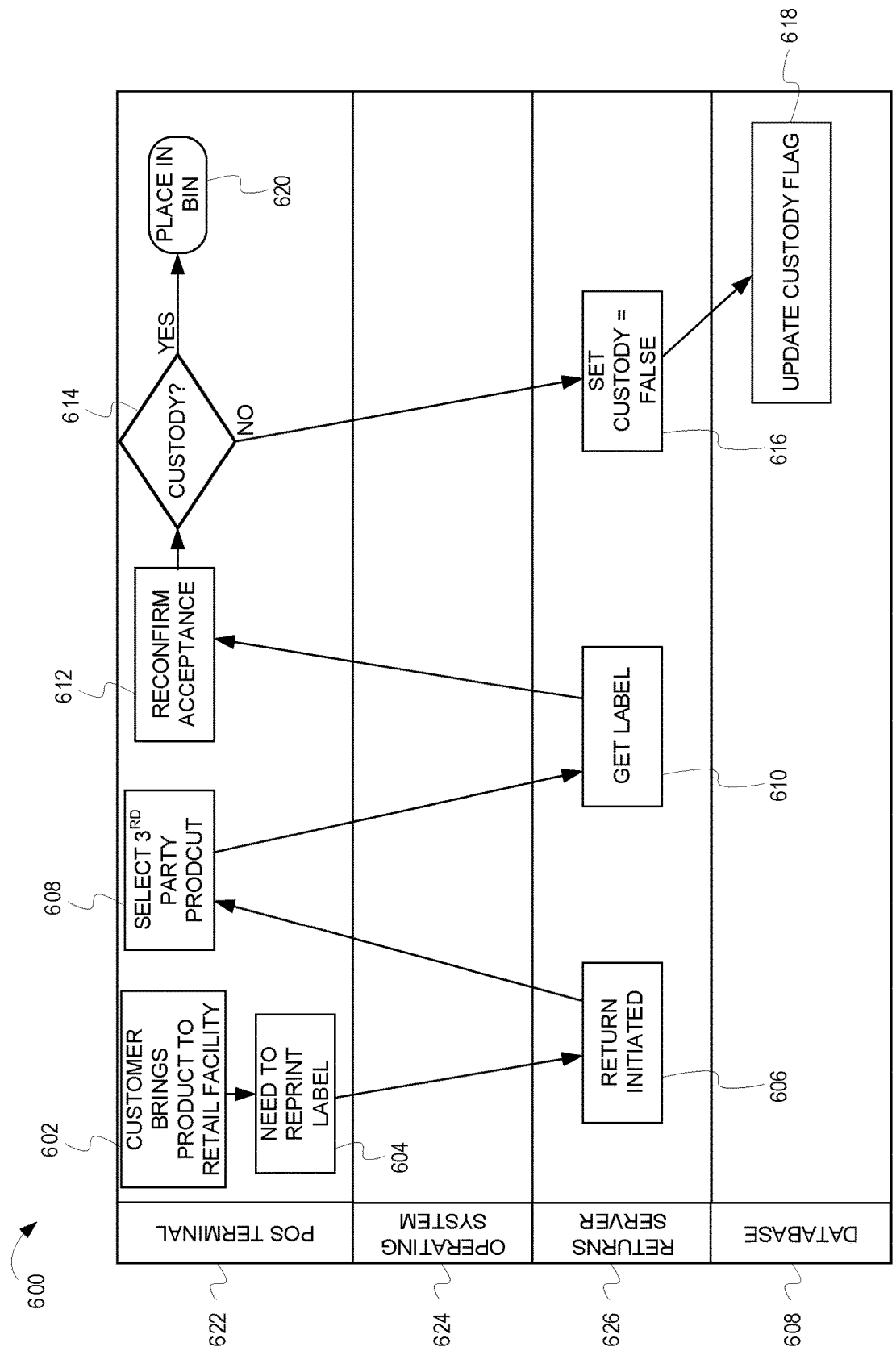
FIG. 6 is a diagram depicting a flow path 600 for reprinting a label, according to some embodiments.

While the discussion of FIG. 5 provides additional detail regarding a flow path for processing returns, the discussion of FIG. 6 provides additional detail regarding reprinting return labels.

FIG. 6 is a diagram depicting a flow path 500 for reprinting a return label, according to some embodiments. In some cases, a return label may need to be reprinted for a customer. The flow path 500 depicts operations between a POS terminal 622, an operating system 624, a returns server 626, and a database 628. For example, the customer may have printed the return label at home but failed to bring it with him or her, the return label may be lost during the return process, etc.

The process begins with the customer bringing the product to the retail facility at operation 602. In this case, a return label needs to be reprinted at operation 604. To reprint the return label, a return is initiated at the returns server 626 at operation 606. The customer, or employee, selects a third-party product to return at operation 608. The returns server 626 retrieves the already-generated return label at operation 610. Because the return label is being reprinted, the returns server 626 has previously generated the return label and thus the return label is retrieved (e.g., from the database 628).

Once the return label is printed by the POS terminal 622, the customer, or employee, reconfirms acceptance of the return at operation 612 indicating whether the product (i.e., the product being returned) is still in the custody of the retailer (e.g., possessed by the retailer or otherwise controlled by the retailer) at operation 614. For example, if the product has not yet been shipped, it may still be located within the retailer's system (e.g., within the retail facility) and thus in the custody of the retailer. If the product is still in the retailer's custody, it is placed in a bin (e.g., a returns bin) at operation 620. If the product is no longer in the retailer's custody (e.g., the product has already been shipped), the returns server 626 sets a custody flag as false in the database 628 at operations 616 and 618.

While the discussion of FIGS. 5 and 6 provide additional detail regarding a flow path for processing returns, the discussion of FIG. 7 provides additional detail regarding a database for storing order information.

FIG. 7 is a diagram of a table 700 including order information, according to some embodiments. The table 700 is a representative example of the storage of order information in a database. The table 700 includes a number of fields. For example, the table 700 includes an order number column 702, a date column 704 indicating a date of the order, a product number column 706, a price column 708, a fees column 710, a refund amount column 712, and a custody flag column 714. While the table 700 depicted in FIG. 7 includes seven columns, embodiments are not so limited. That is, the database can store greater, or less than, seven columns of order information. Additionally, the columns depicted in the table 700 are but examples, and any desired data, and therefore columns, can be included in the table 700. For example, the table 700 could include order information such as order numbers, transaction numbers, dates (e.g., purchase dates, return dates, shipping dates, etc.), third party seller identification, third party return address information, third party seller return policy information, item numbers, prices (e.g., product prices, order totals, etc.), fees (e.g., restocking fees, shipping fees, etc.), credits (e.g., taxes paid, subscription refunds, etc.), refund amounts (e.g., the amount to be refunded to the customer based on the purchase price less fees plus credits), custody flags, return reasons, seller identification numbers, product details, etc.

With respect to the example table 700 depicted in FIG. 7, the order number column 702 includes order numbers (e.g., invoice numbers, transaction numbers, etc.) for orders placed by customers. The remaining columns include additional data associated with the order numbers. For example, as depicted in FIG. 7, the date column 704 indicates a date associated with the order, the product number column 706 includes product numbers for the products associated with the order number, the price column 708 includes prices for the products associated with the order, the fees column 710 indicates any fees associated with return of the products associated with the order number, the refund amount column 712 indicates a total refund due to the customer, and the custody flag column 714 indicates the custody of the products associated with the order number.

While the discussion of FIG. 7 provides additional detail regarding a table including order information, the discussion of FIG. 8 provides additional detail regarding a user interface for processing returns.

FIG. 8 is a diagram of an example user interface 800 for processing returns, according to some embodiments. The user interface 800 is presented, for example, via a display device of a POS terminal. The user interface 800 can be presented via a web browser or an application executing on the POS terminal. The user interface 800 is presented to and allows an employee, or customer, to initiate a return of a product.

The user interface 800 includes a number of fields. As the user interface 800 is but an example, it should be noted that user interfaces for processing returns can include greater or fewer fields, as well as different fields than those included in the user interface 800 depicted in FIG. 8. As depicted in FIG. 8, the user interface 800 includes an order number input field 804, an order data field 808, and a custody indicator field 826 (i.e., a custody prompt). The order number input field 804 prompts the user (e.g., an employee or customer) to enter the order number. The user enters the order number via a user input device associated with the POS terminal. For example, the user can scan a receipt, order invoice, etc. via a scanner, enter an order number manually, lookup an order number, etc. Once the user has entered the order number, the user interface 800 presents information associated with the order number in the order data field 808.

The order data field 808 include return selections 810, product numbers 812, descriptions 814, and prices 816 for each of the products associated with the order number. As depicted in FIG. 8, the order number is associated with the purchase of three products: 1) a first product 820, a second product 822, and a third product 824. The first product 820 is a computer, the second product 822 is a keyboard, and the third product 824 is a wireless mouse. As indicated by the return selections 810, the user has selected the second product 822 to return.

In some embodiments, a custody flag can be set to indicate that one or more events associated with the return have occurred. The custody flag may be set by the associate or the customer through the selection of the custody indicator field 826. The custody field indicator field 826 is displayed to the user at a point in time during the return process that corresponds to the event/s that are indicated by the custody setting. When the event/s have occurred (e.g., when the custody of the returned product has changed from the customer to the retailer), the user selects the custody indicator field 826. As one example, if the user is an employee of the retail facility, when the customer provides the product to the employee, the employee selects the custody indicator field 826. As another example, if the user is the customer, when the customer relinquishes possession of the product to be returned (e.g., by placing the product in a designated bin, providing the product to a customer service desk, printing the return label, placing the return label on the product, etc.), the customer selects the custody indicator field 826. In these examples, the custody indicator field 826 is selectable and indicates that the retailer is now in possession of the product. When the custody indicator field 826 is selected, the control circuit causes the custody flag in the database to be updated.

It is noted that in some embodiments, the setting of the custody field can provide assurances to one or both of the retailer and the third-party seller. In some embodiments, the custody flag is used internally by the retailer for the retailer's purposes, and in other embodiments, the custody flag can be also be shared with third-party sellers. For example, in some embodiments, the custody flag can be used as an indicator to the retailer that employees processing returns are properly processing such returns. In some embodiments, since the returned item is not the property of the retailer accepting the return (it is the property of the third-party seller), it can be used to help ensure or verify to the retailer and/or the third-party seller that the third-party seller property was not mixed with other returns and property of the retailer. In some embodiments, the custody flag can be used to assist in the settling of disputes over a return that may occur between the retailer and the third-party seller, since it can be indicative of the proper handling of the return by the retailer. In some embodiments, the custody flag can be used as part of an overall process used by the retailer to support third-party marketplace sales by making returns at the retail store easy and providing safeguards to ensure that returned products are properly handled and shipped to the third party seller. In such cases, the custody flag can help provide confidence to third-party sellers that the retailer has established a third-party marketplace equipped to handle both sales and returns.

In some embodiments, a system for processing returns comprises a point-of-sale (POS) terminal, wherein the POS terminal is located in a retail facility, and wherein the POS terminal is configured to receive an order identifier, wherein the order identifier is associated with an online order that includes a product, wherein the product was purchased from a third-party seller via the retailer's website, wherein the retail facility is a brick-and-mortar facility associated with the retailer, and wherein the third-party seller is not the retailer, present, via a display device of the POS terminal, a custody prompt, receive, via a user input device of the POS terminal, selection of the custody prompt, and transmit, to a control circuit, the order identifier, a database, wherein the database is configured to store order information, and the control circuit, wherein the control circuit is communicatively coupled to the POS terminal, the control circuit configured to receive, from the POS terminal, the order identifier and an indication of the selection of the custody prompt, determine, based on accessing the database, the product, determine, based on accessing the database, that the product is eligible to be returned, determine, based on accessing the database a refund amount for the product, determine, based on accessing the database, a location to which the product should be returned, generate, based on the location to which the product should be returned, a return label, create, with the third-party seller, a return transaction for the product, transmit, to the POS terminal, the return label, update, in the database in response to receipt of the indication of the selection of the custody prompt, a custody flag, wherein the custody flag is associated with the product, and wherein the custody flag indicates possession of the product by the retailer, wherein the POS terminal is further configured to print the return label.

In some embodiments, an apparatus and a corresponding method performed by the apparatus comprises storing, in a database, order information, receiving, at a point-of-sale (POS) terminal, an order identifier, wherein the order identifier is associated with an online order that includes a product, wherein the product was purchased from a third-party seller via a retailer's web site, wherein the POS terminal is located in a retail facility, wherein the retail facility is a brick-and-mortar facility associated with the retailer, and wherein the third-party seller is not the retailer, transmitting, by the POS terminal to a control circuit, the order identifier, receiving, by the control circuit from the POS terminal, the order identifier, determining, by the control circuit based on accessing the database, the product, determining, by the control circuit based on accessing the database, that the product is eligible to be returned, determining, by the control circuit based on accessing the database, a refund amount for the product, determining, by the control circuit based on accessing the database, a location to which the product should be returned, generating, by the control circuit based on the location to which the product should be returned, a return label, creating, by the control circuit with the third-party seller, a return transaction for the product, transmitting, bye the control circuit to the POS terminal, the return label, printing, by the POS terminal, the return label, presenting, via a display device of the POS terminal, a custody prompt, receiving, via a user input device of the POS terminal, selection of the custody prompt, transmitting, by the POS terminal to the control circuit, an indication of the selection of the custody prompt, and updating, in the database in response to receipt of the indication of the selection of the custody prompt, a custody flag, wherein the custody flag is associated with the product, and wherein the custody flag indicates possession of the product by the retailer.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for processing product returns, the system comprising:
   a point-of-sale (POS) terminal, wherein the POS terminal is located in a retail facility, and wherein the POS terminal is configured to:
   receive an order identifier, wherein the order identifier is associated with an online order that includes a product, wherein the product was purchased from a third-party seller via a retailer's website, wherein the retail facility is a brick-and-mortar facility associated with the retailer, and wherein the third-party seller is not the retailer;
   present, via a display device of the POS terminal, a custody prompt, the custody prompt requesting an input of a confirmation that possession of the product has been transferred to the retailer;
   receive, via a user input device of the POS terminal, selection of the custody prompt, the selection of the custody prompt serving as a confirmation that an employee of the retailer accepted the product and the possession of the product has been transferred to the retailer; and transmit, to a control circuit, the order identifier and an indication of the selection of the custody prompt;
a database, wherein the database is configured to store order information; and
the control circuit, wherein the control circuit is communicatively coupled to the POS terminal, the control circuit configured to:
receive, from the POS terminal, the order identifier;
determine, based on accessing the database, the product;
determine, based on accessing the database, that the product is eligible to be returned;
determine, based on accessing the database, a refund amount for the product;
determine, based on accessing the database, a location to which the product should be returned;
generate, based on the location to which the product should be returned, a return label;
transmit a notification to a computing device of the third-party seller indicating that the product is being returned;
transmit, to the POS terminal, the return label;
transmit a signal to the database to update, in the database in response to receipt of the indication of the selection of the custody prompt, a custody flag, wherein the custody flag is associated with the product, and wherein the custody flag indicates the possession of the product by the retailer;
responsive to the update of the database to include the custody flag, trigger a start of a timer, the timer setting a predetermined threshold period of time for the third-party to issue a refund to a customer for the product returned to the retailer, wherein upon an expiration of the timer, the control circuit is programmed to issue the refund to the customer for the product returned to the retailer even if the third-party has not issued the refund to the customer for the product returned to the retailer;
permit the POS terminal to print the return label; and
prevent the POS terminal from printing the return label until the indication of the selection of the custody prompt is transmitted from the POS terminal to the control circuit.

2. The system of claim 1, wherein the database is further configured to: store third-party seller information, wherein the third-party seller information includes return eligibility rules.

3. The system of claim 2, wherein the return eligibility rules include one or more of return windows, return shipping fees, and restocking fees.

4. The system of claim 3, wherein the determination that the product is eligible to be returned is based on the return windows, and wherein the determination of the refund amount is based on the return shipping fees and the restocking fees.

5. The system of claim 2, wherein third-party sellers provide the third-party seller information to the database.

6. The system of claim 1, wherein the control circuit is further configured to:
issue, based on the refund amount, a refund for the product.

7. The system of claim 6, wherein the refund is issued after confirmation is received that third-party seller received the product.

8. The system of claim 1, wherein the control circuit is further configured to:

receive, from the POS terminal, a request for the return label;
retrieve, based on the request for the return label, the return label, wherein the return label has previously been generated; and
retransmit, to the POS terminal, the return label.

9. The system of claim 1, wherein selection of the custody prompt indicates that the return label has been printed, the return label has been placed on the product, and the product has been placed in a designated area.

10. A method for processing product returns, the method comprising:
storing, in a database, order information;
receiving, at a point-of-sale (POS) terminals, an order identifier, wherein the order identifier is associated with an online order that includes a product, wherein the product was purchased from a third-party seller via a retailer's website, wherein the POS terminal is located in a retail facility, wherein the retail facility is a brick-and-mortar facility associated with the retailer, and wherein the third-party seller is not the retailer;
transmitting, by the POS terminal to a control circuit, the order identifier;
receiving, by the control circuit from the POS terminal, the order identifier;
determining, by the control circuit based on accessing the database, the product;
determining, by the control circuit based on accessing the database, that the product is eligible to be returned;
determining, by the control circuit based on accessing the database, a refund amount for the product;
determining, by the control circuit based on accessing the database, a location to which the product should be returned;
generating, by the control circuit based on the location to which the product should be returned, a return label;
transmitting, by the control circuit, a notification to a computing device of the third-party seller indicating that the product is being returned;
transmitting, by the control circuit to the POS terminal, the return label; presenting, via a display device of the POS terminal, a custody prompt, the custody prompt requesting an input of a confirmation that possession of the product has been transferred to the retailer;
receiving, via a user input device of the POS terminal, selection of the custody prompt, the selection of the custody prompt serving as a confirmation that an employee of the retailer accepted the product and the possession of the product has been transferred to the retailer;
transmitting, by the POS terminal to the control circuit, an indication of the selection of the custody prompt;
by the control circuit:
transmitting a signal to the database to update, in the database in response to receipt of the indication of the selection of the custody prompt, a custody flag, wherein the custody flag is associated with the product, and wherein the custody flag indicates the possession of the product by the retailer;
responsive to the update of the database to include the custody flag, by the control circuit:
triggering a start of a timer, the timer setting a predetermined threshold period of time for the third-party to issue a refund to a customer for the product returned to the retailer; and
upon an expiration of the timer, issuing the refund to the customer for the product returned to the retailer even if the third-party has not issued the refund to the customer for the product returned to the retailer;

permitting, by the control circuit, the POS terminal to print the return label; and preventing the POS terminal from printing the return label until the indication of the selection of the custody prompt is transmitted from the POS terminal to the control circuit.

11. The method of claim 10, wherein the database includes third-party seller information, and wherein the third-party seller information includes return eligibility rules.

12. The method of claim 11, wherein the return eligibility rules include one or more of return windows, return shipping fees, and restocking fees.

13. The method of claim 12, wherein the determining that the product is eligible to be returned is based on the return windows, and wherein the determining the refund amount is based on the return shipping fees and the restocking fees.

14. The method of claim 11, wherein third-party sellers provide the third-party seller information to the database.

15. The method of claim 10, further comprising: issuing, based on the refund amount, a refund for the product.

16. The method of claim 15, wherein the refund is issued after confirmation is received that third-party seller received the product.

17. The method of claim 10, further comprising:

receiving, by the control circuit from the POS terminal, a request for the return label;

retrieving, by the control circuit based on the request for the return label, the return label, wherein the return label was previously generated; and retransmitting, to the POS terminal by the control circuit, the return label.

18. The method of claim 10, wherein selection of the custody prompt indicates that the return label has been printed, the return label has been placed on the product, and the product has been placed in a designated area.

* * * * *

UNITED STATES PATENT AND TRADEMARK OFFICE
CERTIFICATE OF CORRECTION

PATENT NO. : 11,748,761 B2
APPLICATION NO. : 17/235669
DATED : September 5, 2023
INVENTOR(S) : Maheer Manmohan et al.

It is certified that error appears in the above-identified patent and that said Letters Patent is hereby corrected as shown below:

On the Title Page

Item (57), under "Abstract", in Column 2, Line 2, delete "to processing" and insert -- for processing --, therefor.

In the Claims

In Column 18, Claim 9, Line 7, delete "wherein" and insert -- wherein the --, therefor.

In Column 18, Claim 10, Line 14, delete "terminals," and insert -- terminal, --, therefor.

In Column 20, Claim 18, Line 16, delete "wherein" and insert -- wherein the --, therefor.

Signed and Sealed this
Twenty-sixth Day of December, 2023

Katherine Kelly Vidal
*Director of the United States Patent and Trademark Office*